（12）United States Patent
Matsushita et al.

(10) Patent No.: US 7,161,317 B2
(45) Date of Patent: Jan. 9, 2007

(54) ELECTROMOTIVE POWER STEERING CONTROLLER

(75) Inventors: Masaki Matsushita, Tokyo (JP);
Takayuki Kifuku, Tokyo (JP);
Hiroyuki Kozuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/211,577

(22) Filed: Aug. 26, 2005

(65) Prior Publication Data

US 2006/0076832 A1    Apr. 13, 2006

(30) Foreign Application Priority Data

Sep. 7, 2004    (JP)    ............................ 2004-259445

(51) Int. Cl.
*H02P 7/00*    (2006.01)

(52) U.S. Cl. ...................... 318/432; 318/727; 318/437; 701/41; 180/443

(58) Field of Classification Search ........ 318/430–437, 318/707, 727; 701/41; 180/443
See application file for complete search history.

(56) References Cited

U.S. PATENT DOCUMENTS

| 4,869,333 | A | 9/1989 | Morishita et al. |
| 6,504,336 | B1* | 1/2003 | Sakamaki ................... 318/727 |
| 2001/0005121 | A1* | 6/2001 | Sakamaki ................... 318/727 |
| 2003/0062870 | A1* | 4/2003 | Royak et al. ............... 318/727 |
| 2005/0087387 | A1* | 4/2005 | Ueda et al. .................. 180/443 |
| 2005/0125124 | A1* | 6/2005 | Nagase et al. ................ 701/41 |
| 2005/0156549 | A1* | 7/2005 | Suzuki et al. .............. 318/437 |
| 2006/0022626 | A1* | 2/2006 | Kobayashi et al. ......... 318/432 |
| 2006/0043917 | A1* | 3/2006 | Kifuku et al. .............. 318/432 |

FOREIGN PATENT DOCUMENTS

| JP | 63-180568 A | 7/1988 |
| JP | 63-185067 A | 7/1988 |
| JP | 6-29031 B2 | 4/1994 |
| JP | 6-59834 B2 | 8/1994 |
| JP | 8-322291 A | 12/1996 |
| JP | 2001-187578 A | 7/2001 |

\* cited by examiner

*Primary Examiner*—Paul Ip
(74) *Attorney, Agent, or Firm*—Sughrue Mion, PLLC

(57) ABSTRACT

An objective is to provide a specific realization means for easily determining malfunction of a system in an electromotive power steering controller. The electromotive power steering controller includes: a voltage controller for controlling voltage applying to a motor based on a d-axis current command value and a q-axis current command value that are set by a d-q-command-value setting unit, and a d-axis current detection value and a q-axis current detection value that are obtained by, using the d-q coordinate system, transforming three-phase ac current that has been actually flowing in the motor and has been detected by a current detector; and a malfunction determining unit for determining that malfunction has occurred in the control system if at least one of the phase-current detection value is out of a first predetermined permissible range.

12 Claims, 15 Drawing Sheets

ELECTROMOTIVE POWER STEERING CONTROLLER

BACKGROUND OF THE INVENTION

1. Field of the Invention

The present invention relates to electromotive power steering controllers that perform power-assisted steering by applying torque generated by a motor to a steering mechanism.

2. Description of the Related Art

Heretofore an electromotive power steering controller has been known, in which torque generated by a motor such as a three-phase brushless motor is transmitted to a steering mechanism, thus power-assisted steering is performed (for example, refer to Japanese Laid-Open Patent Publication 187,578/2001 (hereinafter refer to as Patent document 1)).

The relationships between a motor M for assisting this electromotive power steering controller and a controller C for controlling the motor M are illustrated in FIG. 14, and a block diagram representing a functional configuration of a conventional electromotive power steering controller is illustrated in FIG. 15.

FIG. 14 represents a relationship among the controller C for controlling the electromotive power steering controller, a value inputted into the controller C, and the motor M that the controller C controls. The motor M, which is not illustrated in the specification, assistively supplies torque to the electromotive power steering controller, and the motor M is driven by a motor driver 52 that is controlled by the controller C. Here, a vehicle speed V obtained by a vehicle speed sensor 42, steering torque T detected by a torque sensor 43 and phase-compensated through a phase-compensation circuit 44, and a rotor angle $\theta_{re}$ of the motor M detected by a resolver R connected to the motor M and by a rotor-angle detecting circuit 45 are inputted into the controller C. Moreover, because the motor M is controlled with electric current feedback being applied thereto by the controller C, a three-phase current detection value detected by a motor-current detector 41 is inputted into the controller.

Next, FIG. 15 is explained. In this motor controller, the vehicle speed V detected by the vehicle speed sensor 42 and the steering torque T that has been detected by the torque sensor 43 and phase-compensated through a phase-compensation circuit 44 are inputted into the controller C. Moreover, the motor controller is provided with a target current calculator 61 for determining a target current command value I'$_a$* (effective three-phase current flowing through the U-phase, V-phase, and W-phase) in which current is applied to the motor M. In order to improve steering feeling, a convergent correction value I$_{co}$*, determined by the vehicle speed V and a rotor angular rate $\omega_{re}$ that is obtain by a rotor angle $\theta_{re}$ of the motor M, detected by the resolver R and a rotor angular detecting circuit 45, being passed through a rotor angular rate calculator 65 and outputted therefrom, is calculated; then the convergence correction value is given to an adder 62. In the adder 62, the target current command value I'$_a$*, inputted thereinto from the target current calculator 61, and the convergence correction value I$_{co}$*, inputted thereinto from a convergence corrector 64, are summed up; then, a convergence-compensated target-current command value I$_a$* is set, which represents the amplitude of the three-phase current to be applied to the U-phase, V-phase, and W-phase of the motor M. Moreover, in order to enable the current value to be treated as a dc current amount independent from the rotor angle $\theta_{re}$ of the motor M, in a q-axis current command value calculator 66, a q-axis current command value i$_{qa}$* is determined with a d-q coordinate conversion being applied to the target current command value I$_a$* after the convergence correction has been performed. On the other hand, a d-axis current command value i$_{da}$* is set at zero.

The d-axis current command value i$_{da}$* and the q-axis current command value i$_{qa}$* are inputted into subtractors 67d and 67q, respectively. These subtractors 67d and 67q are constituted so that a d-axis current detection value i$_{da}$ and a q-axis current detection value i$_{qa}$ are obtained by the output from the U-phase current detector 41u for detecting the U-phase current i$_{ua}$ that actually flows in the U-phase of the motor M, and the output from the V-phase current detector 41v for detecting the V-phase current i$_{va}$ that actually flows in the V-phase of the motor M being passed through a three-phase ac/d-q coordinate transformer 68. Consequently, from the subtractors 67d and 67q, deviations of the d-axis current command value i$_{da}$* and the d-axis current detection value i$_{da}$, and deviations of the q-axis current command value i$_{qa}$* and the q-axis current detection value i$_{qa}$, are outputted, respectively.

The deviations outputted from the subtractors 67d and 67q are applied to a d-axis current PI (proportional integration) controller 69d and a q-axis current PI controller 69q; thereby a d-axis voltage command value V$_{da}$* and a q-axis voltage command value V$_{qa}$* are obtained, respectively.

The d-axis voltage command value V$_{da}$* and q-axis voltage command value V$_{qa}$* are inputted into a d-q/three-phase ac coordinate transformer 72. The rotor angle $\theta_{re}$ detected in the rotor angle detecting circuit 45 has been also inputted into this d-q/three-phase ac coordinate transformer 72; therefore, the d-q/three-phase ac coordinate transformer 72 transforms, in accordance with the following equation (1), the d-axis voltage command value V$_{da}$* and q-axis voltage command value V$_{qa}$* into command values V$_{ua}$* and V$_{va}$* in the three-phase ac coordinate system, respectively. Then, the U-phase voltage command values V$_{ua}$* and V-phase voltage command value V$_{va}$* obtained are inputted into a three-phase PWM (pulse width modulation) modulator 51.

$$\begin{bmatrix} V'^*_{va} \\ V^*_{ua} \\ V^*_{wa} \end{bmatrix} = \sqrt{\frac{2}{3}} \begin{bmatrix} \cos\theta_{re} & -\sin\theta_{re} \\ \cos\left(\theta_{re} - \frac{2\pi}{3}\right) & -\sin\left(\theta_{re} - \frac{2\pi}{3}\right) \\ \cos\left(\theta_{re} - \frac{4\pi}{3}\right) & -\sin\left(\theta_{re} - \frac{4\pi}{3}\right) \end{bmatrix} \begin{bmatrix} V^*_{da} \\ V^*_{qa} \end{bmatrix} \quad (1)$$

However, a W-phase voltage command value V$_{wa}$* is not calculated in the d-q/three-phase ac coordinate transformer 72, but calculated in a W-phase voltage command value calculator 73 on the basis of the U-phase voltage command value V$_{ua}$* and V-phase voltage command value V$_{va}$* that have been calculated in the d-q/three-phase ac coordinate transformer 72. That is, into the W-phase voltage command value calculator 73, the U-phase voltage command value V$_{ua}$* and V-phase voltage command value V$_{va}$* are inputted from the d-q/three-phase ac coordinate transformer 72, and, in the W-phase voltage command value calculator 73, a W-phase voltage command value V$_{wa}$* is obtained by subtracting from zero the U-phase voltage command value V$_{ua}$* and V-phase voltage command value V$_{va}$*.

The W-phase voltage command value V$_{wa}$* calculated in the W-phase voltage command calculator 73, similarly to the U-phase voltage command value V$_{ua}$* and V-phase voltage command value V$_{va}$*, is applied to the three-phase PWM modulator 51. The three-phase PWM modulator 51 generates PWM signals Su, Sv, and Sw corresponding to the U-phase voltage command value $V_{ua}^*$, V-phase voltage command value $V_{va}^*$, and W-phase voltage command value $V_{wa}^*$, respectively, and the generated PWM signals Su, Sv, and Sw are outputted to the motor driver 52. Thereby, voltages $V_{ua}$, $V_{va}$, and $V_{wa}$, corresponding to the PWM signals Su, Sv, and Sw, are applied to the U-phase, V-phase, and W-phase, respectively, of the motor M, whereby the motor M generates torque required for the power-assisted steering.

Moreover, in the above described Patent document 1, an abnormality judging unit 74 is provided for judging whether an abnormality such as an offset has occurred, in which the unit 74 is configured to judge, on the basis of the d-axis current detection value $i_{da}$ and q-axis current detection value $i_{qa}$ outputted from the three-phase ac/d-q coordinate transformer 68, whether an abnormality has occurred. Provided that the U-phase current $i_{ua}$, V-phase current $i_{va}$, and W-phase current $i_{wa}$ each have an amplitude $I_a$, the d-axis current $i_{da}$ and the q-axis current $i_{qa}$ are expressed by the following equation (2), which are understood to be irrelevant to the rotor angle $\theta_{re}$. Therefore, the abnormality judging unit 74 can acquire the d-axis current $i_{da}$ and the q-axis current $i_{qa}$ irrelevantly to the rotor angle $\theta_{re}$, and determine, on the basis of the acquired d-axis current $i_{da}$ and the q-axis current $i_{qa}$, whether or not an abnormality is present. It is described in this document that the effective value of the current flowing through the motor M also need not be calculated.

$$\begin{bmatrix} i_{da} \\ i_{qa} \end{bmatrix} = \begin{bmatrix} 0 \\ -\sqrt{\left(\frac{3}{2}\right)} I_a \end{bmatrix} \quad (2)$$

SUMMARY OF THE INVENTION

In the above Patent document 1, specific realization methods for malfunction determination, that is, methods as to which portions of the amplitude $I_a$, the d-axis current detecting value $i_{da}$, and the q-axis current detecting value $i_{qa}$, etc. should be used are not disclosed at all.

Therefore, an objective of the present invention, which is made according to the above described situation, is to provide a specific realization means for easily determining malfunction of a control system in an electromotive power steering controller.

An electromotive power steering controller, according to a first aspect of the present invention, for performing power-assisted steering by applying to a steering mechanism torque generated by a motor includes: a d-q command value setting unit for determining, as current to be applied to the motor, d-axis and q-axis current command values in a d-q coordinate system; a current detector for detecting phase current actually flowing in the motor; a three-phase/d-q coordinate transformer for transforming each of phase-current detection values detected by the current detector into a d-axis current detection value and a q-axis current detection value in the d-q coordinate system; a motor driver 52 for controlling a voltage applied to the motor, based on the d-axis current command value and the q-axis current command value determined by the d-q command value setting unit, and on the d-axis current detection value and the q-axis current detection value outputted from the three-phase/d-q coordinate transformer; and a malfunction determining unit for determining that a malfunction has occurred in the control system if at least one of the phase-current detection values is out of a first predetermined permissible range.

An electromotive power steering controller according to a second aspect of the present invention determines that a malfunction has occurred in the control system, if a state in which at least one of the phase-current detection values is out of the first predetermined permissible range continues for not less than a second predetermined time.

An electromotive power steering controller according to a third aspect of the present invention determines that a malfunction has occurred in the control system, if, in a third predetermined time, a state in which the phase-current detection value is out of the first predetermined permissible range continues for not less than the second predetermined time.

An electromotive power steering controller according to a fourth aspect of the present invention decides the maximum value of the third predetermined time for enabling malfunction determination without fail.

An electromotive power steering controller according to a fifth aspect of the present invention determines that a malfunction has occurred in the control system, if one of the detection values, when current does not flow through a conducting path provided with the current detector, is out of a fourth predetermined permissible range.

An electromotive power steering controller according to a sixth aspect of the present invention forbids malfunction determination when rotational speed of the motor is not lower than a predetermined value.

An electromotive power steering controller according to a seventh aspect of the present invention stops driving motor if a malfunction is detected.

An electromotive power steering controller according to an eighth aspect of the present invention the stops motor driving by stopping supplying electric power to a driving-motor circuit if a malfunction is detected.

An electromotive power steering controller according to a ninth aspect of the present invention stops motor driving by stopping supplying electric power to a pre-driver of a driving-motor circuit if a malfunction is detected.

An electromotive power steering controller according to a tenth aspect of the present invention stops motor driving, if a malfunction is detected, by stopping supplying electric power to the conducting path provided with the current detector.

The electromotive power steering controller according to the first invention is effective in enabling the malfunction determination in the control system of the electromotive power steering controller to be easily performed.

The electromotive power steering controller according to the second invention doesn't determine a case, in which an error due to noise, etc. occurs in the phase-current detection values, to be malfunctioning in the control system of the controller, but enables a normal operation of the control system.

The electromotive power steering controller according to the third invention enables secure malfunction determination even if load current flowing in the motor also comes into an oscillation state due to a malfunction such as a short-circuit of a line connected to the load.

The electromotive power steering controller according to the fourth invention can prevent wrong determination from occurring for excessive current due to the peak values of the three-phase current, given that the sine-wave frequency of the phase-current detection value is f, by setting the third predetermined time not more than ½ f.

The electromotive power steering controller according to the fifth invention can easily determine malfunction in the control system of the electromotive power steeling controller.

The electromotive power steering controller according to the sixth invention can prevent wrong determination due to recovery current generated when the motor is speedily rotated by external force and wrong determination for excessive current due to the peak values of sine-wavelike phase-current inputted at intervals of not more than the third predetermined time.

The electromotive power steering controller according to the seventh invention enables safety of the electromotive power steering controller to be improved by reducing needless electric-power consumption when a malfunction occurs.

The electromotive power steering controller according to the eighth invention can reduce needless electric-power consumption when a malfunction occurs; consequently, a large amount of current flowing generated, when input/output terminals of the semiconductor device included in the motor-driving circuit are short-circuited, is prevented.

The electromotive power steering controller according to the ninth invention can reduce needless electric-power consumption when a malfunction occurs.

The electromotive power steering controller according to the tenth invention can reduce needless electric-power consumption when a malfunction occurs; consequently, needless torque-generation when a malfunction is detected is prevented by shutting down an electric power supplying line to the motor from the motor-driving circuit.

DETAILED DESCRIPTION OF THE PREFERRED EMBODIMENT

Embodiment 1

Figure 1:
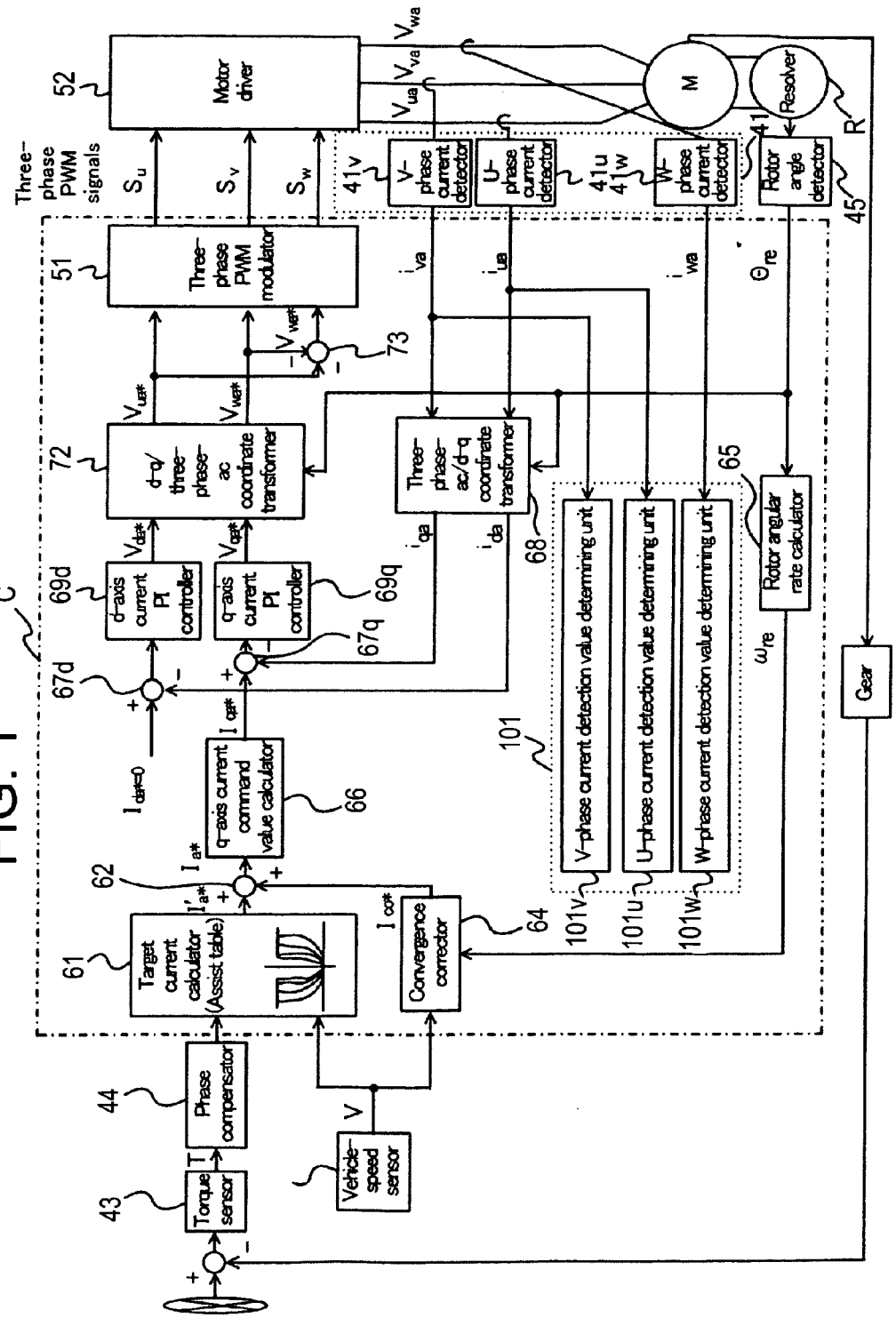
FIG. 1 is a block diagram illustrating a functional configuration of a motor controller used for an electromotive power steering controller according to Embodiment 1 of the present invention.

Hereinafter, embodiments according to the present invention are explained in detail. FIG. 1 is a block diagram for explaining a functional configuration of a motor M used for an electromotive power steering controller according to the present invention.

This motor controller is provided with a target current calculator (a d-q command value setting unit) 61 for determining a target torque current command value $I'_b{}^*$ in order to generate steering-assist torque by the motor M. In order to improve steering feeling, a convergence correction value $I_{co}{}^*$, determined by the vehicle speed V and a rotor angular rate $\omega_{re}$ that is obtain by a rotor angle $\theta_{re}$ of the motor M, detected by the resolver R and a rotor angular detecting circuit 45, being passed through a rotor angular rate calculator 65 and outputted therefrom, is calculated; then the convergence correction value is given to an adder 62. In the adder 62, the target current command value $I'_b{}^*$, inputted from the target current calculator 61, and the convergence correction value $I_{co}{}^*$, inputted from a convergence corrector 64, are summed up; then, a torque-current command value (a q-axis current command value) $i_{qa}{}^*$ to be fed to the motor M is set, after the convergence correction has been performed. On the other hand, an excitation current command value (a d-axis current command value) $i_{da}{}^*$ is set at zero.

Figure 15:
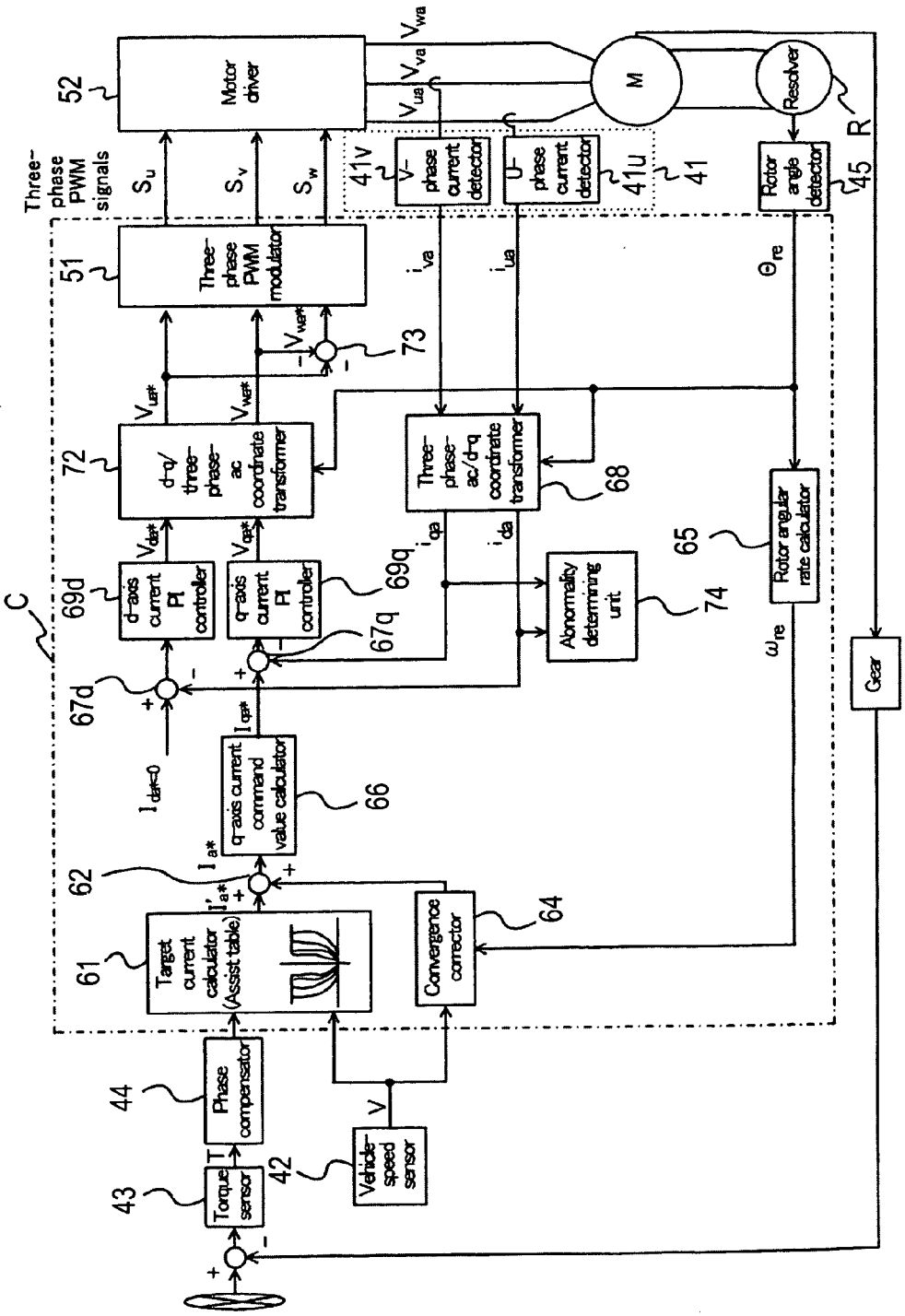
FIG. 15 is a block diagram illustrating a functional configuration of a conventional electromotive power steering controller.

Here, blocks, in FIG. 1, given the same numerals as those in FIG. 15 operate similarly to the blocks represented in FIG. 15; therefore, their detailed explanations are omitted. However, a motor driver 52, a three-phase PWM modulator 51, a W-phase voltage command-value calculator 73, a d-q/three-phase ac coordinate transformer 72, a d-axis current PI controller 69d, a q-axis current PI controller 69q, and subtractors 67d and 67q are hereinafter generically referred to as a voltage controller.

In this embodiment, in order to determine whether the convergence-corrected target current command value $i_{qa}{}^*$, which has been calculated by summing up the target current command value $I'_b{}^*$ determined in the target current calculator 61, and the convergence correction value $I_{co}{}^*$ in the adder 62, is exactly conducted to the motor M, a three-phase-current detection-value determining unit (a malfunction determining unit) 101 is installed in this motor controller. Here, in the conventional motor controller presented in Patent document 1, determination is performed based on the d-axis current detection value $i_{da}$ and the q-axis current detection value $i_{qa}$ calculated through a three-phase ac/d-q coordinate transformer (a three-phase/d-q coordinate transformer) 68 using the two (the U-phase current detection value $i_{ua}$ and the V-phase current detection value $i_{va}$) of the three-phase current detection values conducted to the motor M; however, in the motor controller presented in this Embodiment 1, the determination is performed based on all the three-phase current detection values conducted to the motor M. Therefore, a motor current detector 41 is installed, being composed of a U-phase current detector 41u for detecting the U-phase current, a V-phase current detector 41v for detecting the V-phase current, and a W-phase current detector 41w for detecting the W-phase current.

The three-phase current detection-value determining unit 101 is composed of a U-phase current detection-value determining unit 101u for determining using the U-phase current detection value $i_{ua}$ a malfunction in this motor-controller, a V-phase current detection-value determining unit 101v for determining using the V-phase current detection value $i_{va}$, a malfunction in this motor-controller and a W-phase current detection-value determining unit 101w for determining using the W-phase current detection value $i_{wa}$ a malfunction in this motor-controller. If at least one of the three-phase current detection values of $i_{ua}$, $i_{va}$ and $i_{wa}$ inputted into the three-phase current detection-value determining unit 101 is detected to be out of a predetermined permissible range, this motor controller is determined to be malfunctioning.

Figure 2:
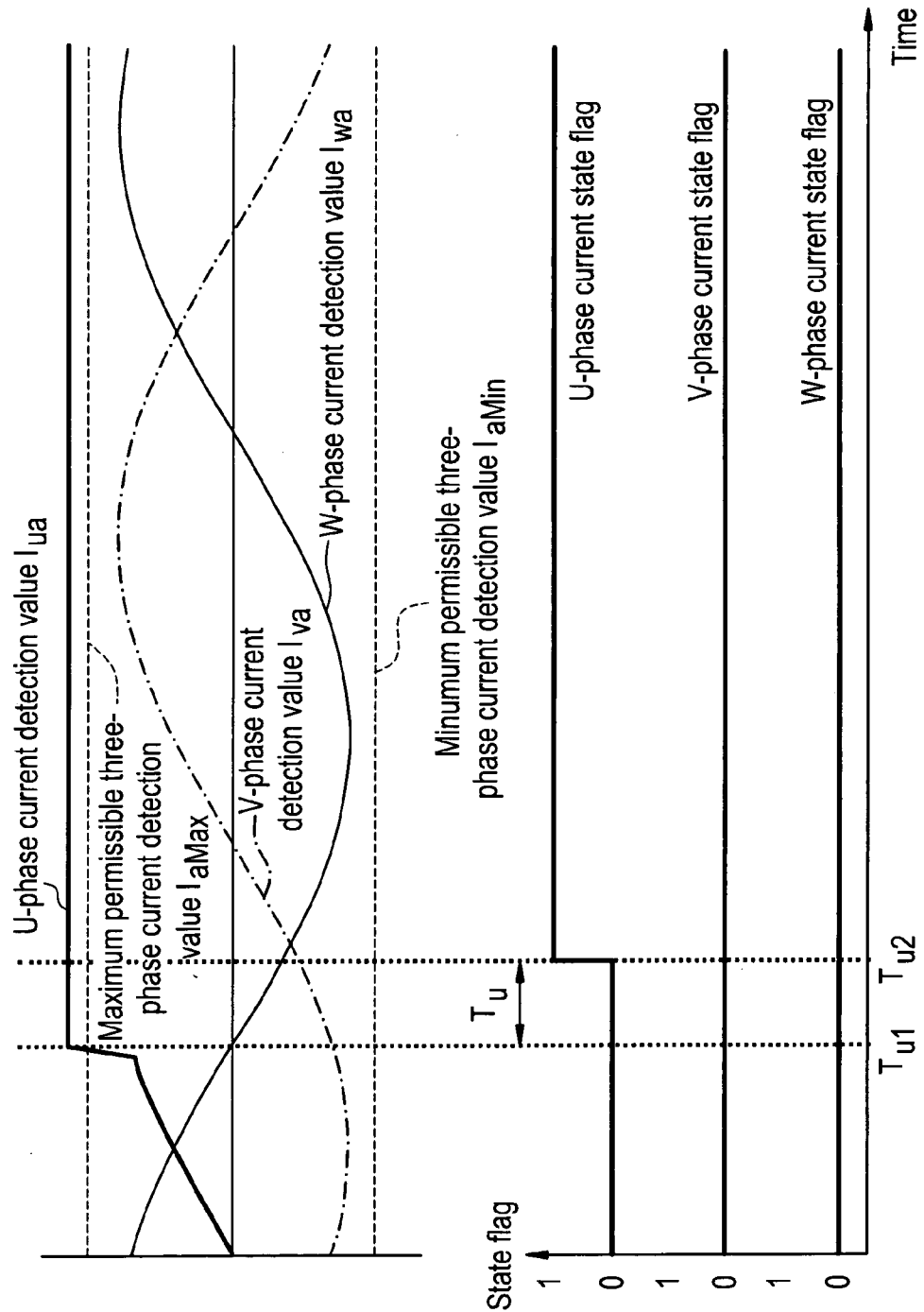
FIG. 2-FIG. 7 are timing charts illustrating operations of the electromotive power steering controller according to Embodiment 1 of the present invention.
Figure 3:
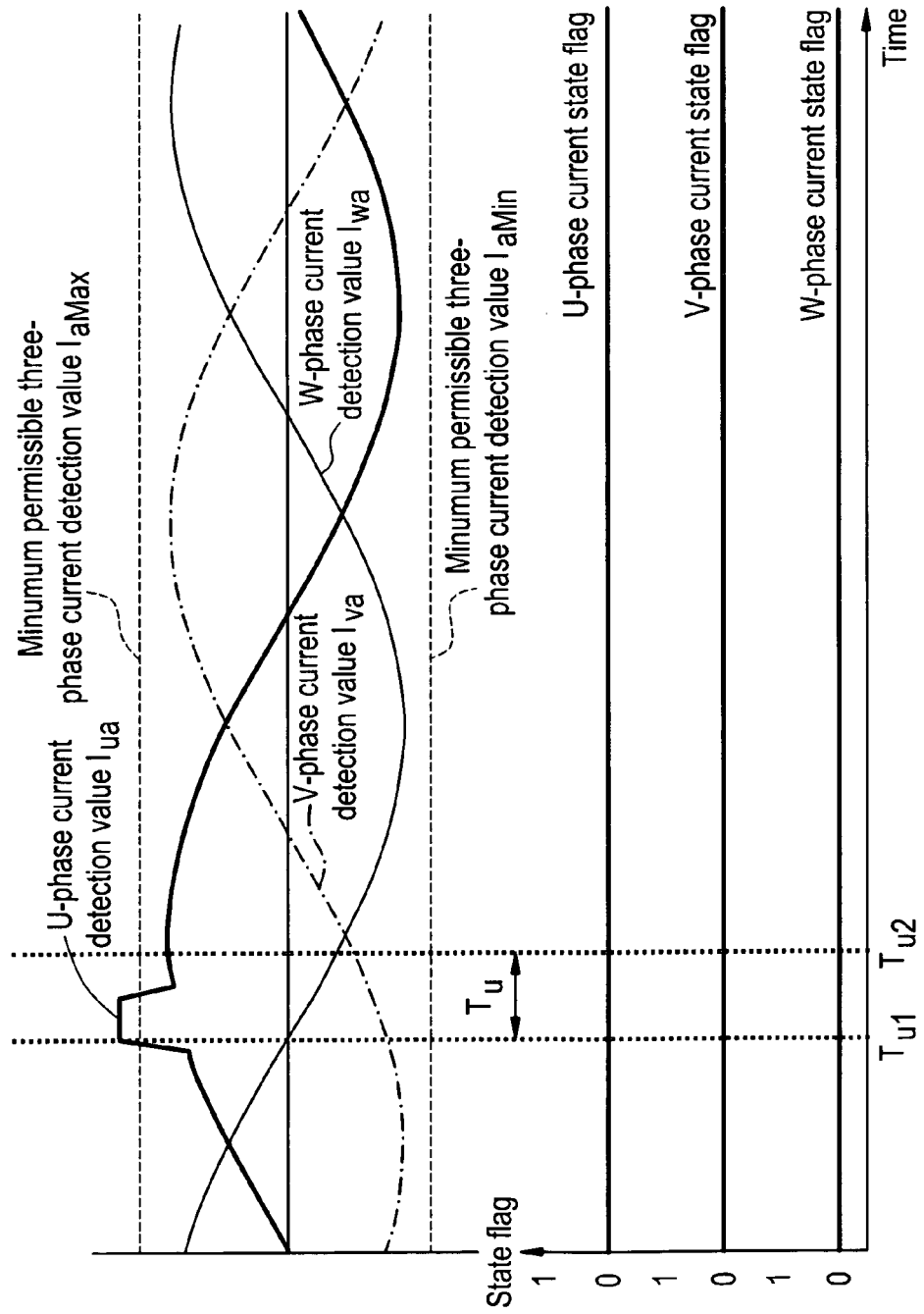

Hereinafter, an operation of the three-phase current detection-value determining unit 101 is explained using FIG. 2 and FIG. 3. FIG. 2 and FIG. 3 represent variations over time of a U-phase-current-state flag, a V-phase-current-state flag and a W-phase-current-state flag that represent states of the U-phase current detection value $i_{ua}$, the V-phase current detection value $i_{va}$ and the W-phase current detection value $i_{wa}$, respectively, that are conducted to the motor M, and also represent an operation when this U-phase current detection value $i_{ua}$ becomes excessive.

Here, in order to determine that the U-phase current detection value $i_{ua}$ is excessive and abnormal, a predetermined permissible range $D_1$ (in a range of $I_{aMin}$–$I_{aMax}$) in which the U-phase current detection value $i_{ua}$ is determined to be normal is predetermined as expressed by the following equation (3). When the U-phase current detection value $i_{ua}$ is included in the above permissible range $D_1$, the U-phase-current-state flag is set at "0" representing normal state; thus, the motor controller is determined to be normal.

$$I_{aMin} \leq I_{ua} < I_{aMax} \quad (3)$$

Wherein, Iua: U-phase current detection value
$I_{aMin}$: Minimum permissible three-phase current detection value
$I_{aMax}$: Maximum permissible three-phase current detection value In this motor controller, in such a case as a malfunction in that a conducting path provided with the above U-phase current detector 41u and a power line, for example, has happened to be short-circuited, the U-phase current detection value $i_{ua}$ becomes maximum at time $T_{u1}$ as represented in FIG. 2, and thus becomes out of the above permissible range $D_1$. Then, in a case in which the U-phase current detection value $i_{ua}$ is also continuously out of the permissible range $D_1$ at time $T_{u2}$ after a second predetermined time $T_u$ (hereinafter referred to as malfunction determining time $T_u$) has passed, the U-phase-current-state flag is set at "1"; consequently, malfunction is determined to have occurred in the control system of this motor controller.

As represented in FIG. 3, in a case in which even though the U-phase current detection value $i_{ua}$ becomes out of the permissible range $D_1$ caused by, for example, interference such as noise, the state does not continue for the malfunction determining time $T_u$, the U-phase current detection value $i_{ua}$ is determined to be normal; thus the U-phase-state flag does not vary to remain set at "0". Even though the U-phase current detection value $i_{ua}$ instantaneously and significantly varies caused by noise, etc., so as to become out of the permissible range $D_1$, by setting the malfunction determining time $T_u$ such as that, the control system is not determined to be malfunctioning; consequently, the motor controller can continue its normal operation.

Moreover, by forbidding malfunction determination when the rotating speed of the motor M is faster than a predetermined value, incorrect determination can be prevented, which may occur due to the determination based on current in which recovery current generated when the motor is rotated by external force and three-phase current conducted to the motor are superimposed; consequently, the motor controller can continue its normal operation.

Figure 4:
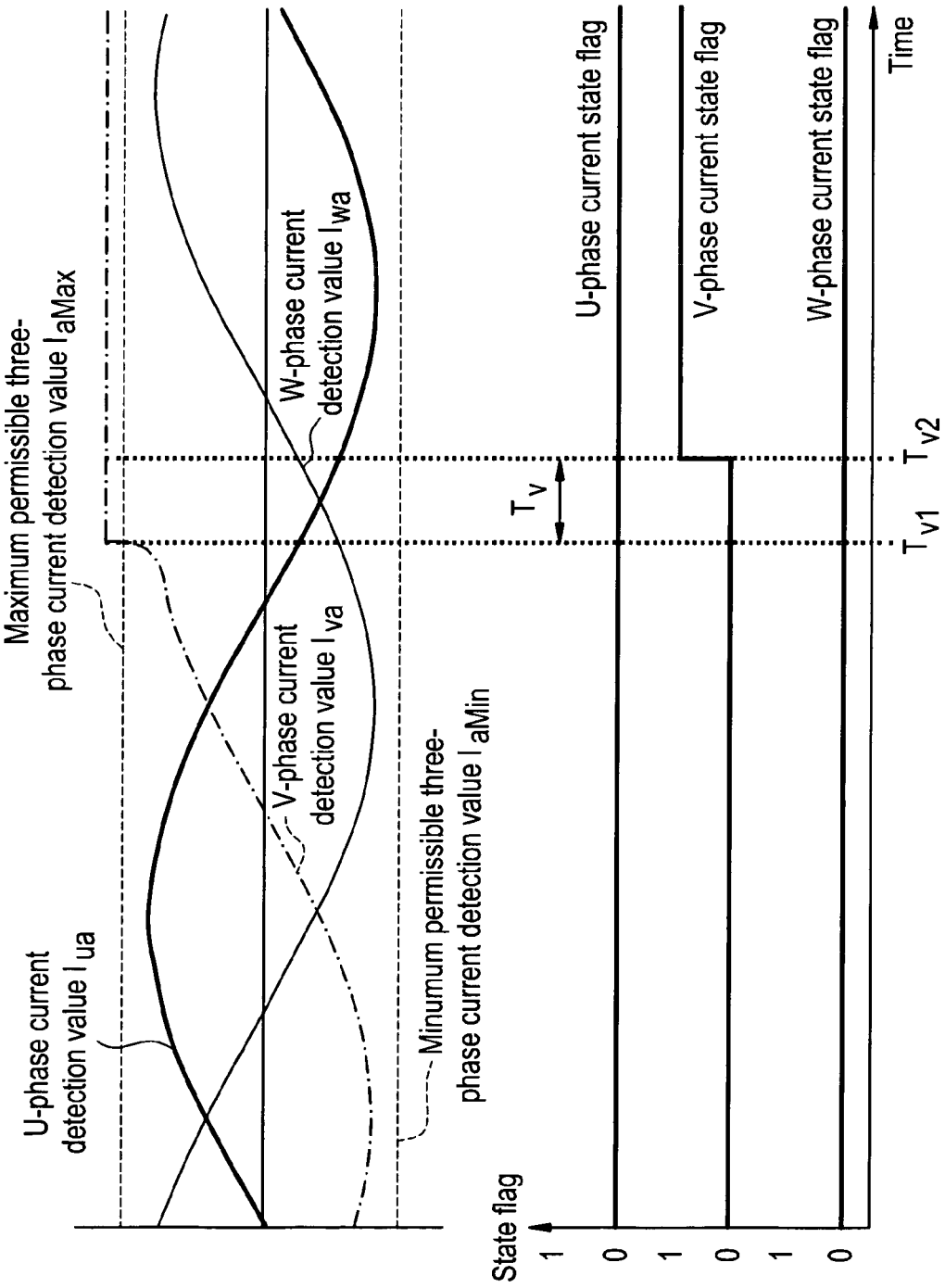
Figure 5:
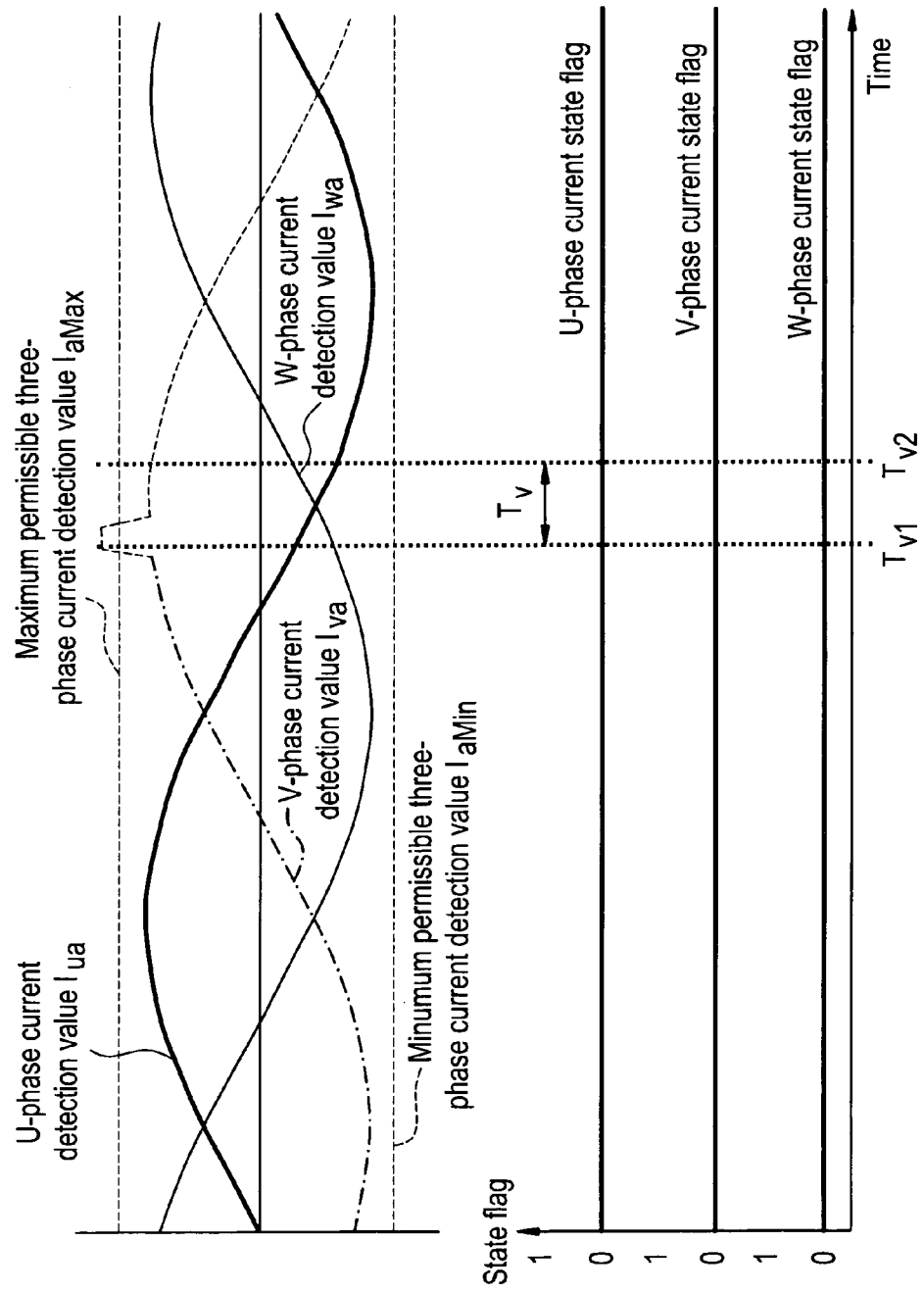
Figure 6:
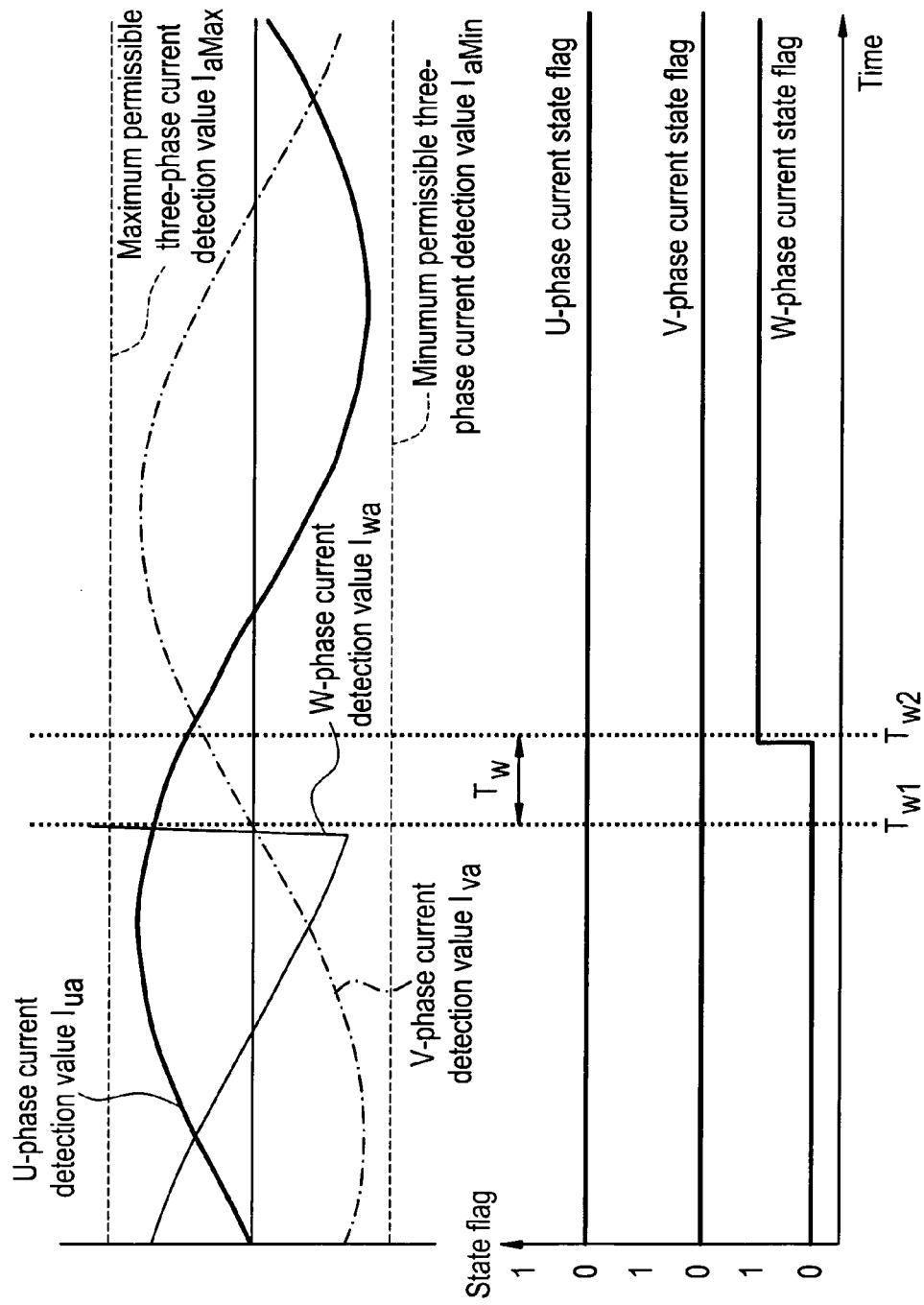
Figure 7:
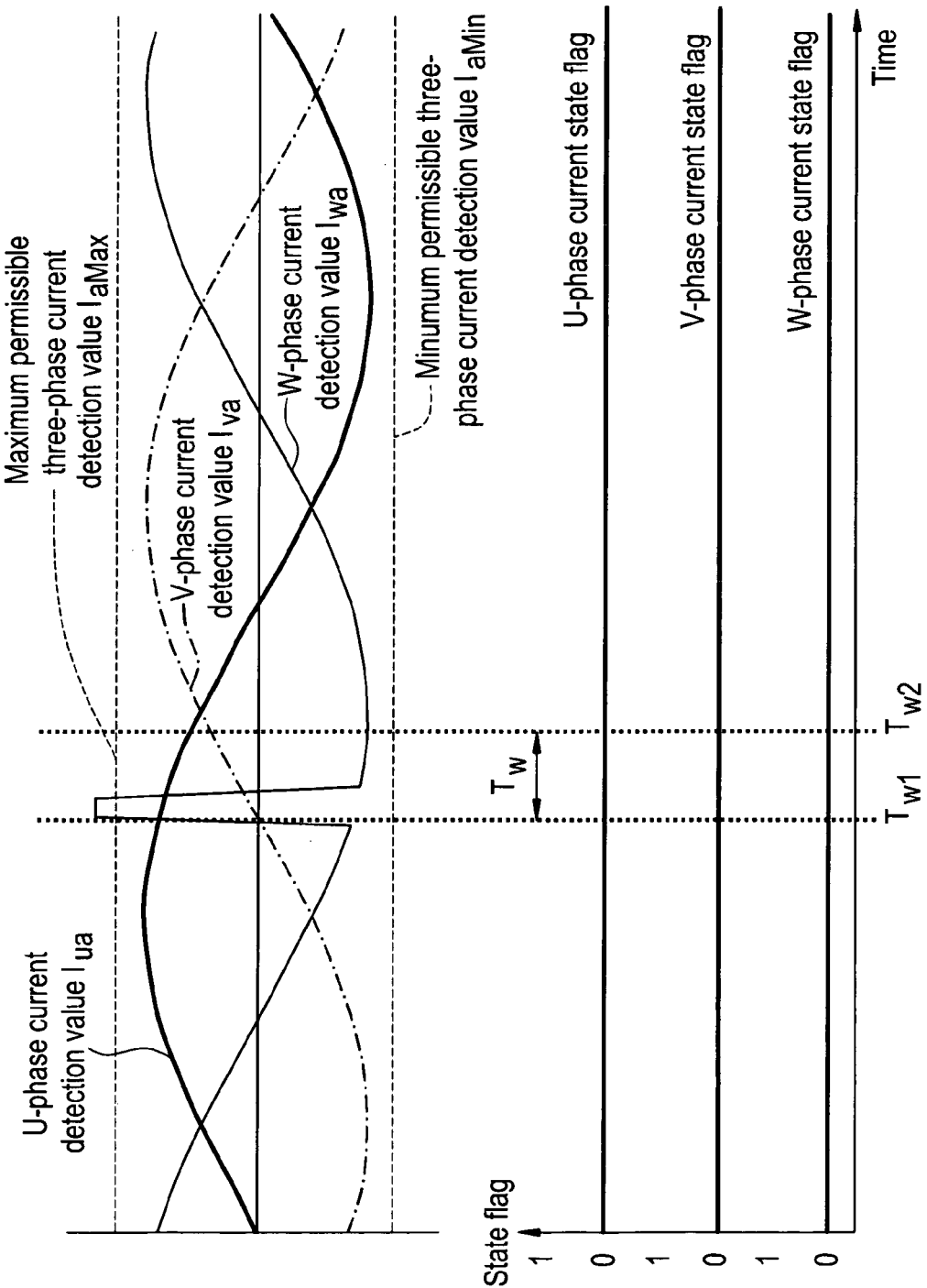

Malfunction-determination operations using the detected V-phase current detection value $i_{va}$, are represented in FIG. 4 and FIG. 5 and in FIG. 6 and FIG. 7 that using the detected W-phase current detection value $i_{wa}$; however, because the operations are similar to the case of the above described U-phase current detection value $i_{ua}$, their detailed explanation is omitted. Moreover, because each amplitude of the current constituting the three-phase current is the same as each other, the permissible range $D_1$ for every phase current can be determined using the minimum permissible three-phase-current detection value $I_{aMin}$ and the maximum permissible three-phase-current detection value $I_{aMax}$.

Embodiment 2

Figure 8:
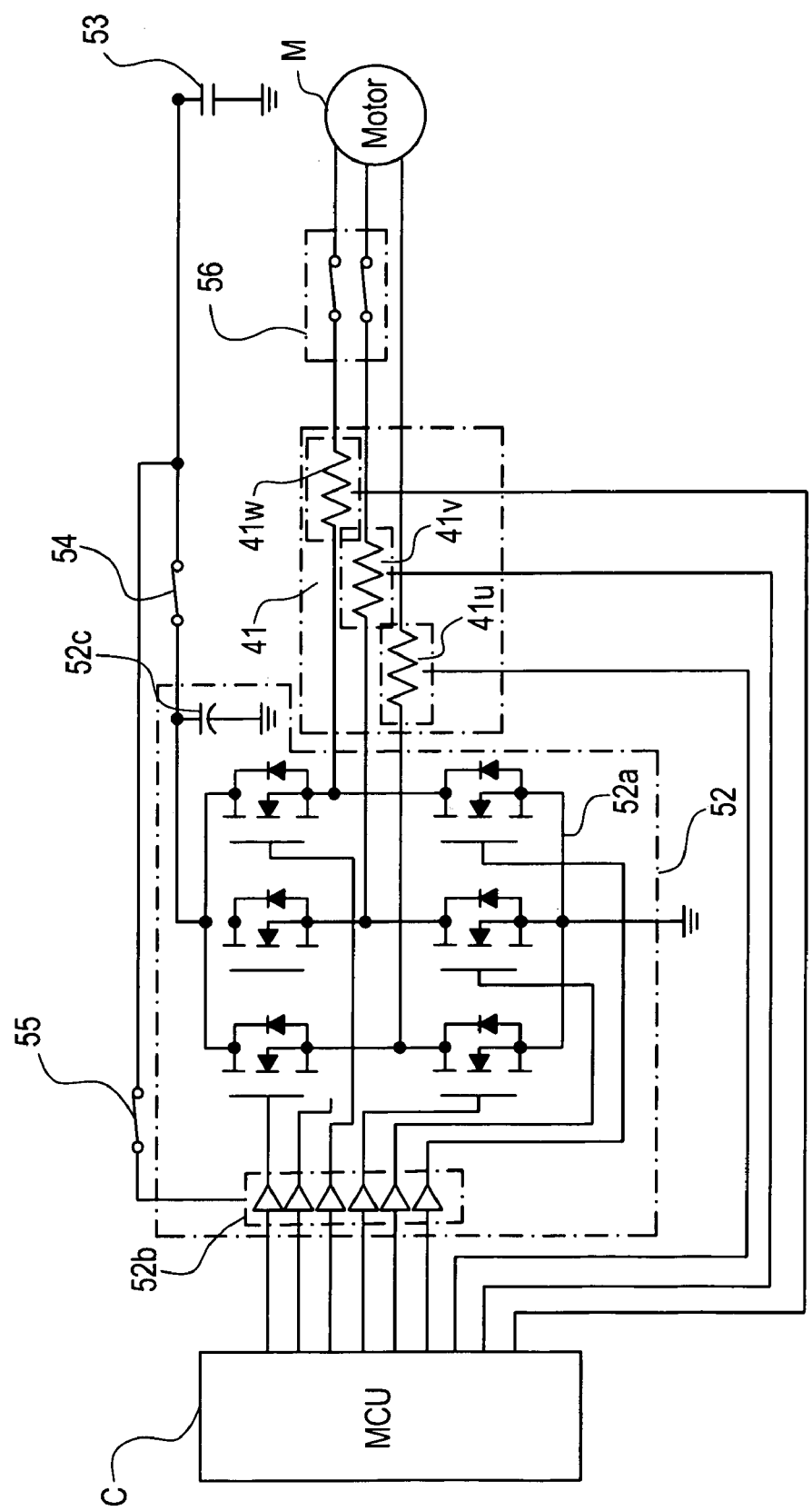
FIG. 8 is a diagram representing a relationship between a motor for controlling an electromotive power steering controller and a controller for controlling the motor, according to Embodiment 2 of the present invention.

FIG. 8 is a detailed electric-circuit diagram explaining a functional configuration of the above described motor driver 52, controller C, and motor M. PWM signals $S_u$, $S_v$ and $S_w$ outputted from the controller C are transmitted, through a pre-driver 52b in the motor driver 52, to base terminals of six semiconductor devices that form a bridge circuit 52a for controlling three-phase current flowing in the motor M. The bridge circuit 52a, the pre-driver 52b, and a polarized capacitor 52c, are supplied with electric power by a single electric power supplier 53, a switch 54 and a switch 55 are provided in order to switch on/off electric power to the motor driver 52, and a switch 56 in order to switch on/off to the motor M.

Figure 9A:
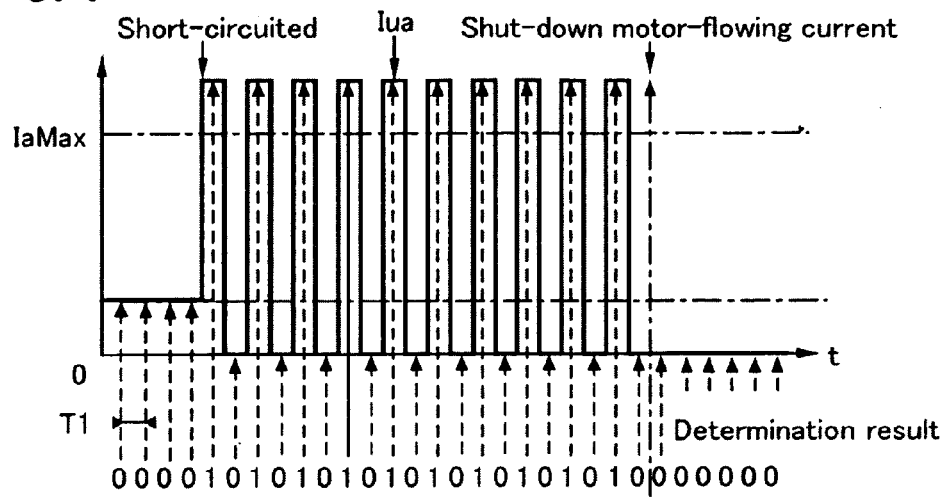
FIG. 9 and FIG. 10 are timing charts illustrating operations of the electromotive power steering controller according to Embodiment 2 of the present invention.
Figure 9B:
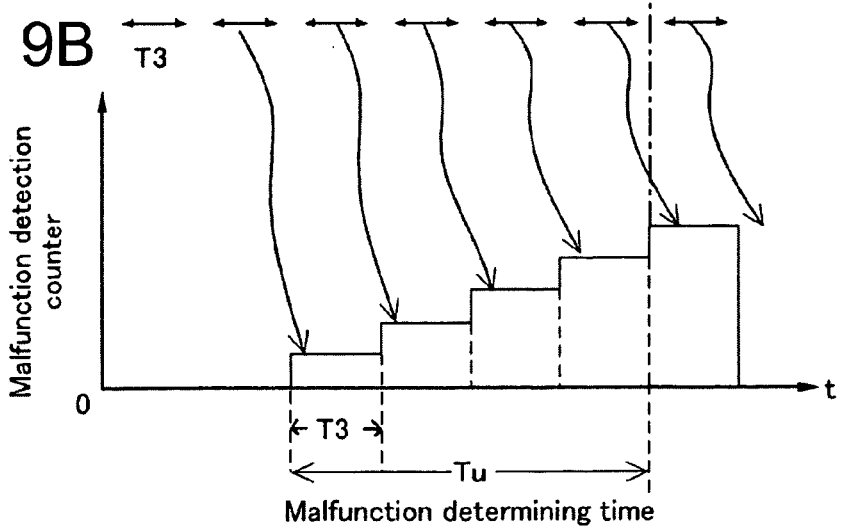
Figure 9C:
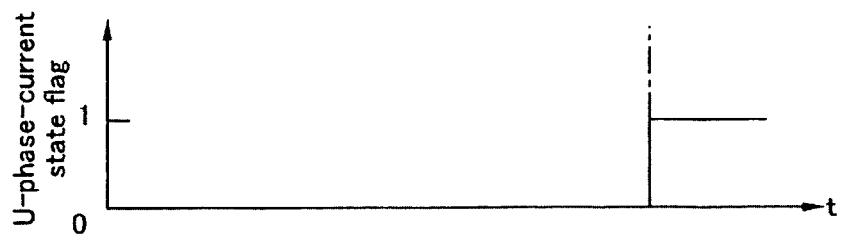

Here, an operation when a short-circuit malfunction has occurred in a conducting path provided with the U-phase current detector 41u is explained by referring to FIG. 9. U-phase flowing current (hereinafter referred to as target current) that is target current flowing in the motor M and is determined based on U-phase voltage to be given to the motor M by the motor driver 52 becomes in a triangular-wave shape whose slope is determined by the electrical time-constant τ and the frequency thereof by PWM carrier frequency. Here, when the cycle of the PWM carrier frequency is set sufficiently shorter than τ, the U-phase current detection value $i_{ua}$ in normal operation can be deemed to be constant, equal to the target current, in t<$t_x$ as represented in FIG. 9A. Here, if a short-circuit malfunction has occurred at t=$t_x$, in the conducting path provided with the U-phase current detector 41u, because, after the short circuit has occurred, inductance and resistance viewed from the voltage controller become extremely small, U-phase flowing current (hereinafter referred to as load current) actually flowing in the motor M rapidly increases, resulting in the U-phase current detection value $i_{ua}$ becoming over $I_{aMax}$, that is, becoming out of the permissible range $D_1$; whereat the voltage controller acts to reduce the load current. The load current that decreases, in normal operation, with the time-constant τ, rapidly decreases, because the inductance viewed from the motor driver 52 can be neglected. Therefore, because the U-phase current detection value $i_{ua}$ at this time is lower than the target current, the voltage controller acts to increase the load current, and then the U-phase current detection value $i_{ua}$ again becomes out of the permissible range $D_1$. Because the above described operation is repeated, the U-phase current detection value $i_{ua}$ becomes constant (the target current) between t=0–$t_x$, while an oscillation in a rectangular-wave-shape occurs in t>$t_x$ as represented in FIG. 9A. The U-phase current detection-value determining unit 101u provided in the controller C sequentially stores into an RAM determination results corresponding to each of the U-phase current detection values $i_{ua}$ each predetermined interval $T_1$ as represented in FIG. 9A. In the above example, the determination results in $t \leq t_x$ are all normal (0), while the results in $t > t_x$ alternately repeat abnormal (1) and normal (0). Then, after the determination results, during a predetermined period $T_3$, each interval $T_3$ are checked, if all of them are normal, a malfunction detection counter is cleared, while if not, one is added to the malfunction detection counter. In the above example, as represented in FIG. 9B, the malfunction detection counter is cleared each predetermined interval $T_3$ in $t \leq t_x$, while the value of the malfunction detection counter increases by one each predetermined interval $T_3$ in $t > t_x$; then, even if the malfunction determination time $T_u$ has elapsed after having started counting by the malfunction detection counter, malfunction is continuously determined when the value of the malfunction detection counter is not nil; consequently, the U-phase current state flag is set "1" as represented in FIG. 9C.

Figure 10A:
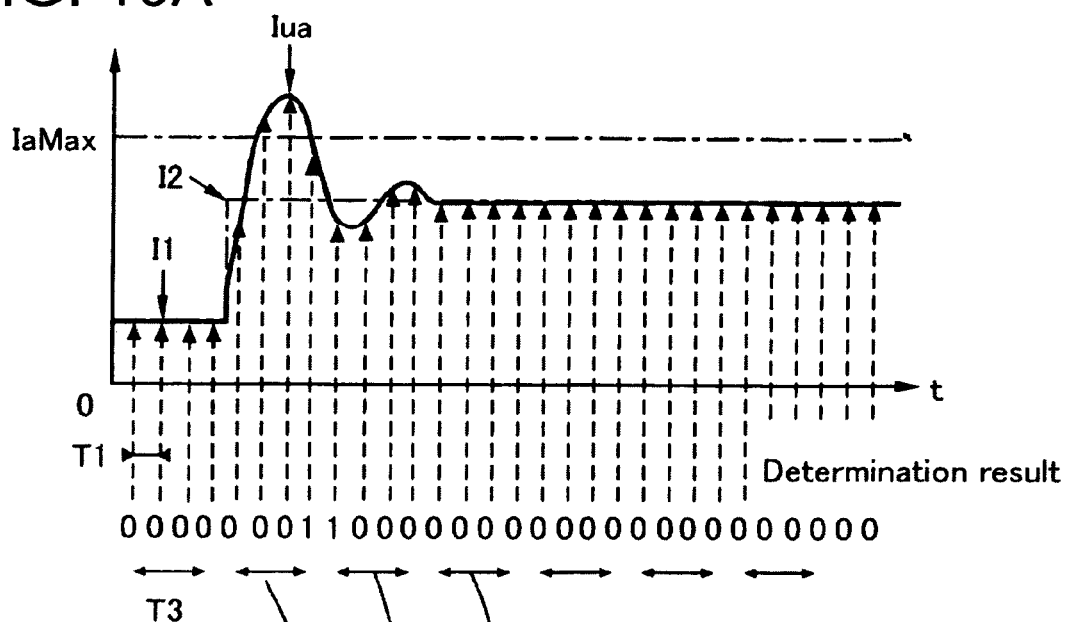
Figure 10B:
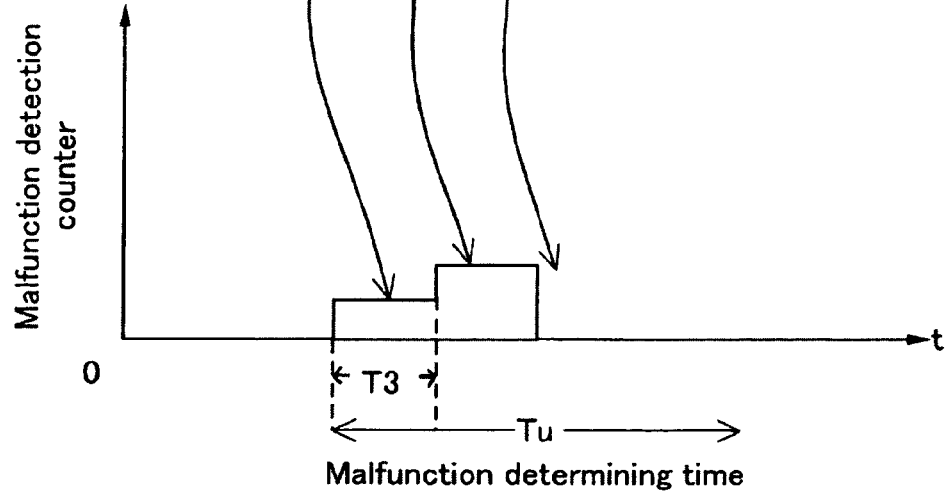
Figure 10C:

On the other hand, an operation when the load current has transiently over-shot caused by a rapid varying of the target current, etc. is explained by referring to FIG. 10. For example, when the target current has increased from $I_1$ to $I_2$, the above described voltage controller acts to make the U-phase current close to the target current $I_2$. Although when the varying amount of the target current is relatively small, the U-phase current smoothly increases towards the target current, when the varying amount is relatively large, the load current rapidly increases to overshoot as represented in FIG. 10A. However, owing to a feedback operation of the voltage controller the U-phase current is decreased to converge to the target current. At this time, the determination results that are sequentially stored into the RAM may sometimes be abnormal (1) in a period during which the U-phase current detection value $i_{ua}$ over-shoots as represented in FIG. 10A; however, the results in the period other than that are normal (0). In the example, because all of the determination results are normal (0) in the next cycle $T_3$ after the malfunction detection counter has counted to "2" (the next period after the overshoot has finished) as represented in FIG. 10B, the malfunction detection counter is cleared. Therefore, in this case, neither malfunction is determined, nor the U-phase current state flag is set "1" as represented in FIG. 10C. That is, even though in the U-phase current detection-value determining unit 101$u$ the U-phase current may become out of the permissible range $D_1$, in a case in which the state does not exceed the malfunction determining time $T_u$, rapid increase of the U-phase current is a temporary overshoot due to a rapid varying of the target current, etc.; consequently, the current is determined not to be out of the permissible range $D_1$ caused by the motor being short-circuited.

In the above embodiment, although a malfunction determination example has been represented based on the U-phase current detection value, similar malfunction detection can be performed based on the V-phase or the W-phase current detection value.

Figure 11:
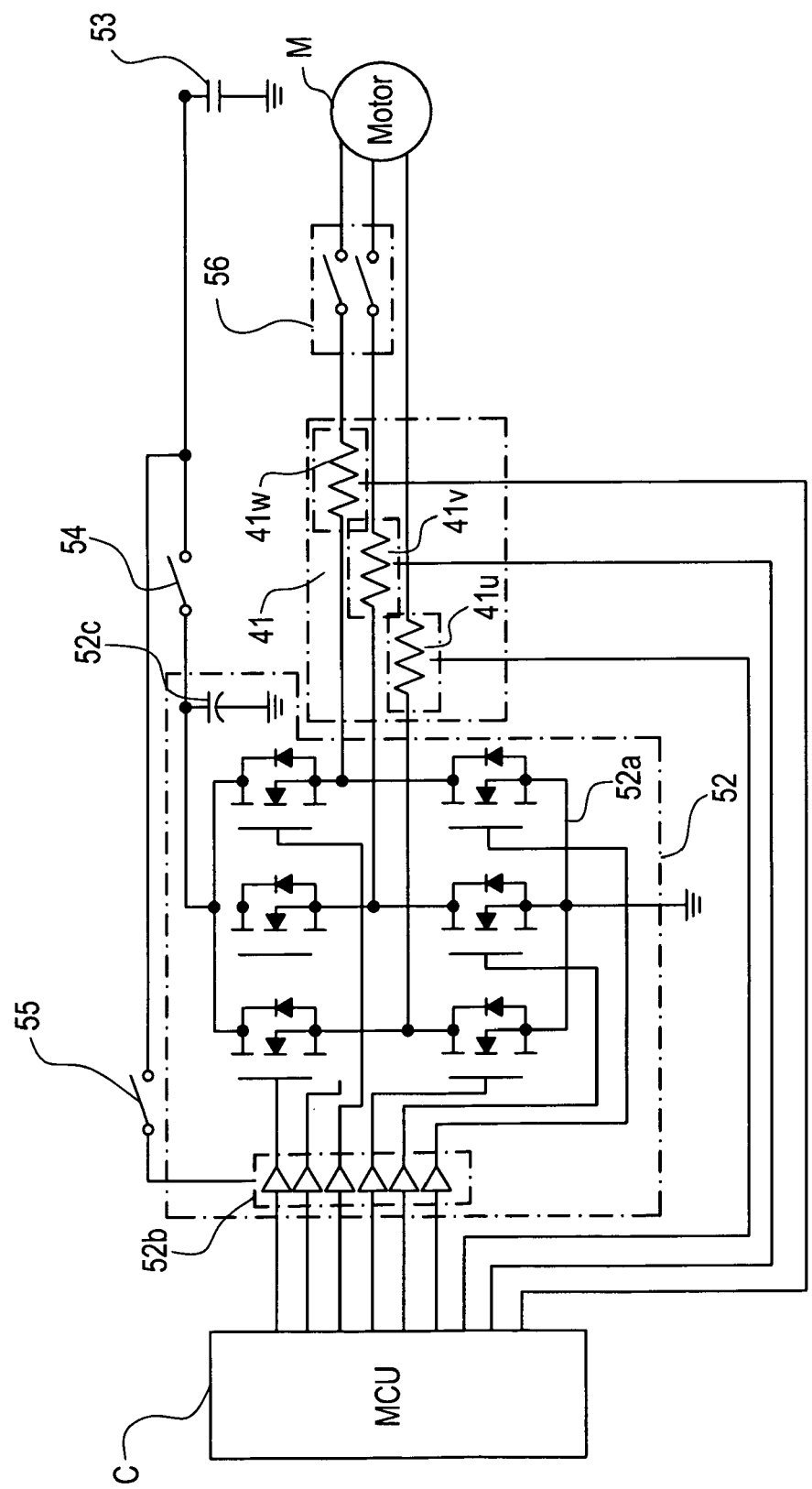
FIG. 11 is a diagram representing an operation of the electromotive power steering controller according to Embodiment 2 of the present invention.

If the control system of the motor controller has been determined to be malfunctioning, by switching off the switch 54, the switch 55, and the switch 56 (referring to FIG. 11), electric power supply to the bridge circuit 52$a$ included in a motor-driving circuit, the pre-driver 52$b$, or the conducting path to the motor M is stopped; consequently, by stopping driving the power-steering system using a motor, electric power consumption in the motor controller can be suppressed. Here, particularly by switching off the switch 54, and stopping supplying electric power to the bridge circuit 52$a$, a large amount of current generated when input/output terminals of the semiconductor devices included in the bridge circuit 52$a$ are short-circuited can be prevented; moreover, by switching off the switch 56, and shutting down an electric power supplying line to the motor M from the bridge circuit 52$a$, needless torque generation, when a malfunction is detected, can be prevented.

Figure 12:
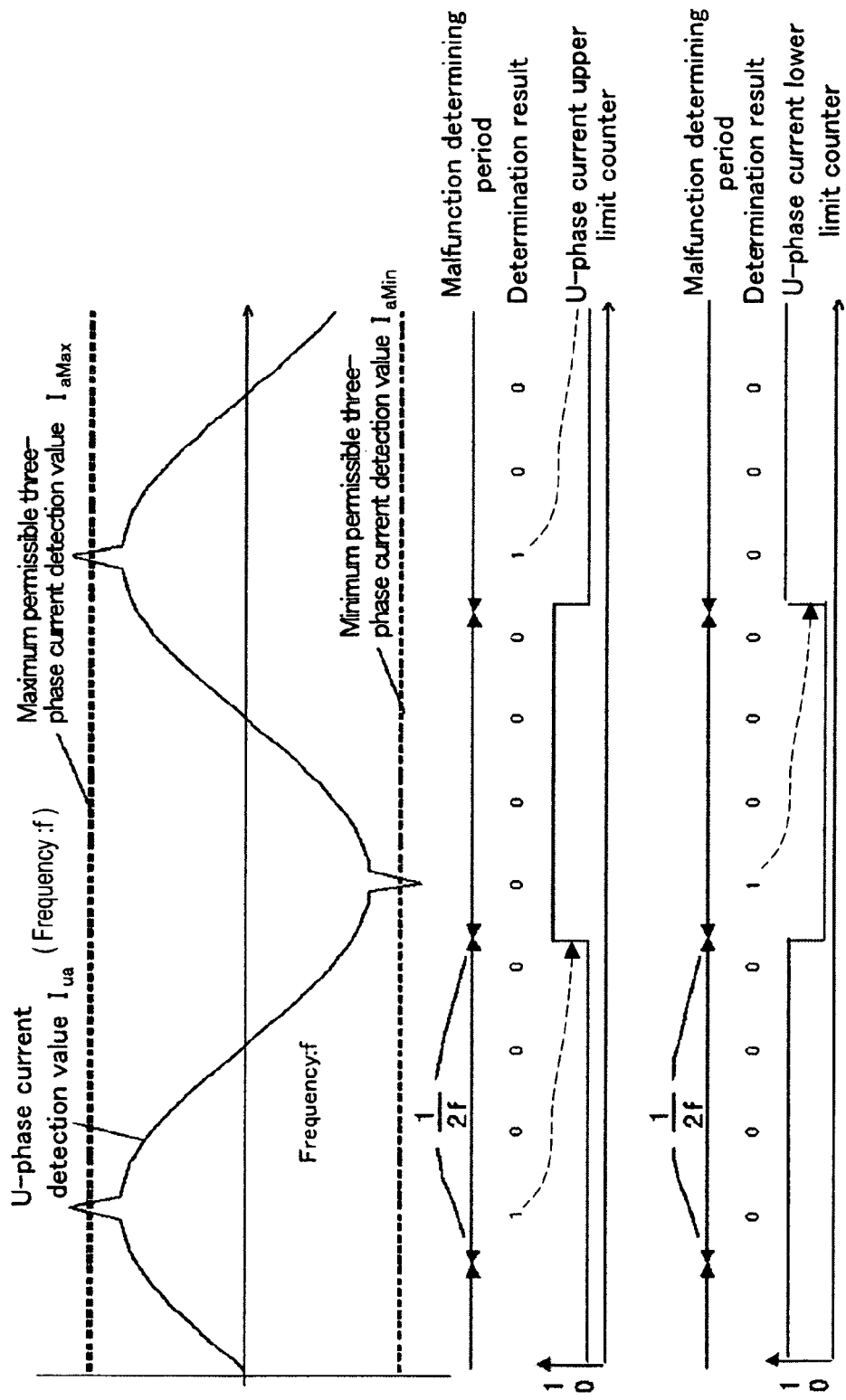
FIG. 12 is a timing chart illustrating an operation of the electromotive power steering controller according to Embodiment 2 of the present invention.

Moreover, the variation of a state flag, when the malfunction determination time $T_u$ is set not longer than ½f of the three-phase current cycle, is explained by referring to FIG. 12.

For example, in FIG. 12, the malfunction detection counter is divided into a U-phase current upper-limit counter and a U-phase current lower-limit counter; thus, when a value not lower than an upper-limit value $I_{aMax}$ in the permissible range $D_1$ is detected, one is added to the U-phase current upper-limit counter, meanwhile when a value not more than an lower-limit value $I_{aMin}$ is detected, one is added to the U-phase current lower-limit counter. Because the three-phase current flowing in the motor M is a sine wave, given that the sine wave frequency of the phase current detection value is f, by setting the malfunction determination time $T_u$ not longer than ½f of the three-phase current cycle, even if an excessive current state at the peak of the three-phase current is continuously detected, both the counters can be cleared; consequently, incorrect determination due to excessive current can be prevented from occurring.

Furthermore, by forbidding malfunction determination when rotating speed of the motor is faster than a predetermined value, incorrect determination is prevented, which is due to the determination based on current in which recovery current generated when the motor M is rotated by external force and three-phase current conducted to the motor are superimposed; consequently, the motor controller can continue its normal operation.

Embodiment 3

Figure 13:
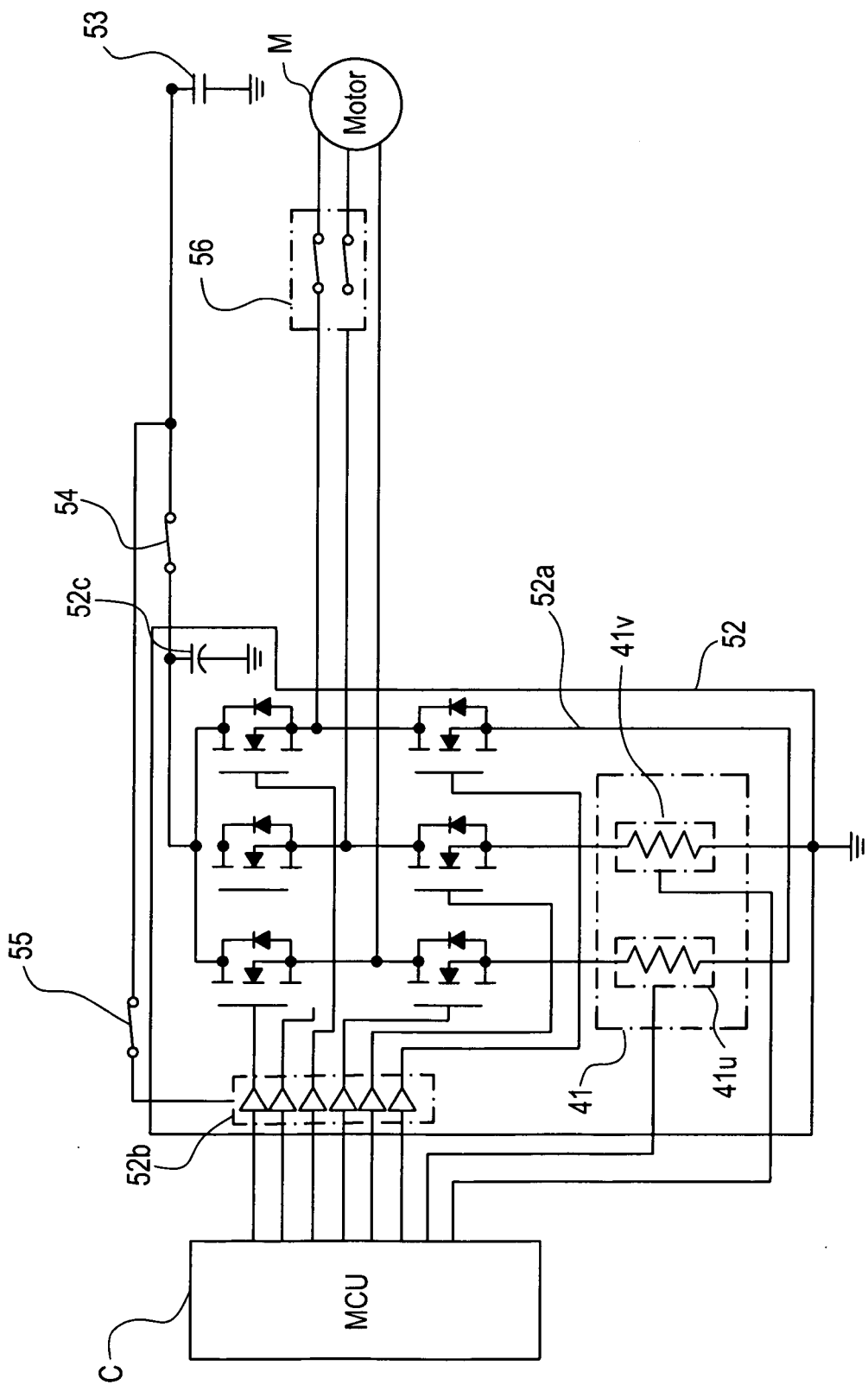
FIG. 13 is a diagram representing a relationship between a motor for controlling an electromotive power steering controller and a controller for controlling the motor, according to Embodiment 3 of the present invention.
Figure 14:
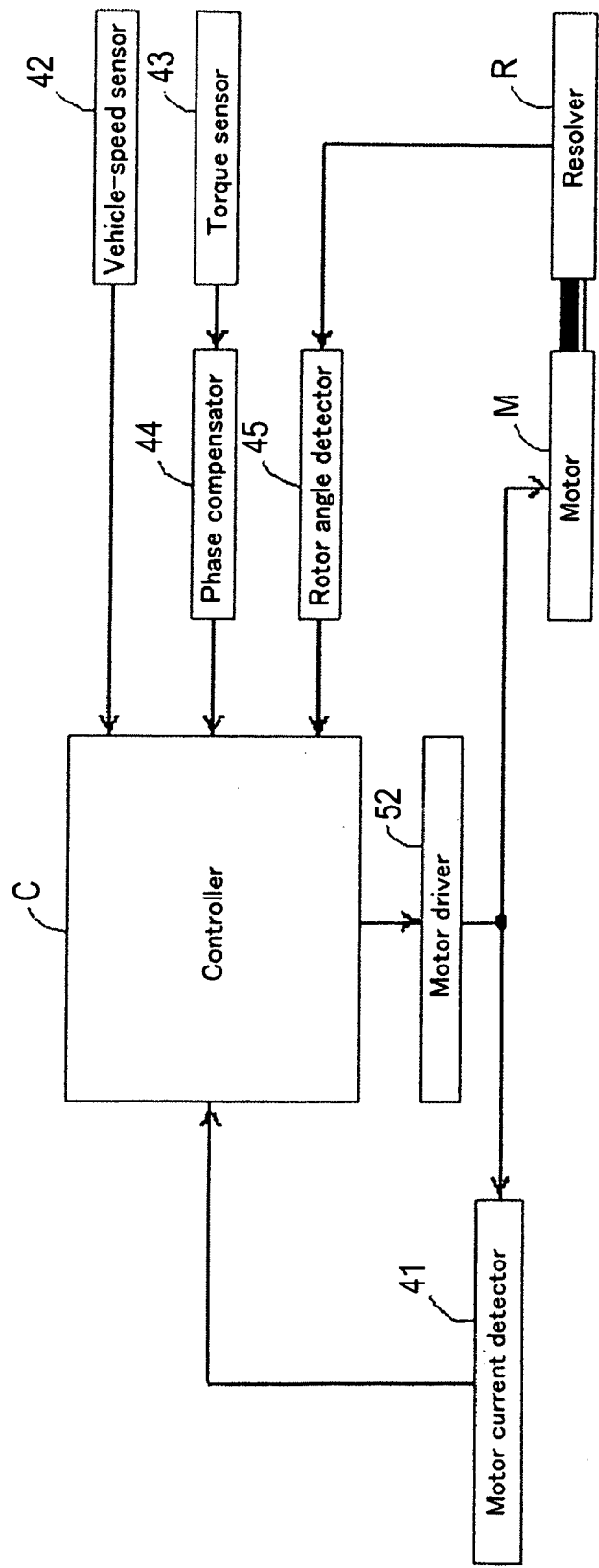
FIG. 14 is a diagram representing a relationship between a motor for controlling a conventional electromotive power steering controller and a controller for controlling the motor.

FIG. 13 is a detailed electric-circuit diagram explaining a functional configuration of the above described motor driver 52, controller C, and motor M. In this example, resistors for detecting current is provided on the common sides of switching devices, which are connected to the negative side of dc voltage, among three sets of switching-device groups included in the bridge circuit 52$a$. As current detector, the U-phase current detector 41$u$ and the V-phase current detector 41$v$ are provided, meanwhile the W-phase current detection value $i_{wa}$ is obtained through calculation based on the U-phase and V-phase current detection value $i_{ua}$ and $i_{va}$. For example, when the switching device connected to the positive side of the U-phase dc voltage is ON, and the switching device connected to the negative side thereof is OFF, current does not flow through the current path provided with the resistor for detecting the U-phase current. When the U-phase current detection value at this time is detected to be close to zero amperes and out of a predetermined range $D_2$, this motor controller is determined to be malfunctioning.

On the contrary, when the switching device connected to the positive side of the U-phase dc voltage is OFF, and the switching device connected to the negative side is ON, current flowing in the motor U-phase flows through the current path provided with the resistor for detecting the U-phase current. Malfunction determination described in Embodiment 1 or Embodiment 2 may be performed based on the U-phase current detection value at this time.

Although in the above embodiment an example of malfunction determination is described based on the U-phase current detection value, similar malfunction determination may be performed based on the detected V-phase current detection value or the calculated W-phase current detection value.

What is claimed is:

1. An electromotive power steering controller for performing power-assisted steering by applying to a steering mechanism torque generated by a motor, the controller comprising:
   a d-q command value setting unit for determining, for current to be applied to the motor, d-axis and q-axis current command values in a d-q coordinate system;
   a current detector for detecting a phase current actually flowing in the motor;
   a three-phase/d-q coordinate transformer for transforming each of phase-current detection values detected by the current detector into a d-axis current detection value and a q-axis current detection value in the d-q coordinate system;
   a voltage controller for controlling a voltage applied to the motor, based on the d-axis current command value and the q-axis current command value determined by the d-q command value setting unit, and on the d-axis current detection value and the q-axis current detection value outputted from the three-phase/d-q coordinate transformer; and
   a malfunction determining unit for determining that malfunction has occurred in the control system if at least one of the phase-current detection values is out of a permissible range according to first predetermination.

2. An electromotive power steering controller as recited in claim 1, wherein the malfunction determining unit determines that malfunction has occurred in the control system, if, in time according to third predetermination, a state in which at least one of the phase-current detection values is out of the first predetermined permissible range continues for not less than a time according to second predetermination.

3. An electromotive power steering controller as recited in claim 2, wherein given that a sine-wave frequency of the three-phase ac current is f, the third predetermined time is set not more than ½ f.

4. An electromotive power steering controller as recited in claim 1, wherein the malfunction determining unit determines that malfunction has occurred in the control system, if a state in which at least one of the phase-current detection values is out of the first predetermined permissible range continues for not less than a time according to second predetermination.

5. An electromotive power steering controller as recited in claim 4, wherein the malfunction determining unit determines that malfunction has occurred in the control system, if, in a time according to third predetermination, a state in which at least one of the phase-current detection values is out of the first predetermined permissible range continues for not less than the second predetermined time.

6. An electromotive power steering controller as recited in claim 5, wherein given that a sine-wave frequency of the three-phase ac current is f, the third predetermined time is set not more than ½ f.

7. An electromotive power steering controller as recited in claim 1, wherein the malfunction determining unit determines that malfunction has occurred in the control system, if one of the detection values, when current does not flow through a conducting path provided with the current detector, is out of a permissible range according to fourth predetermination.

8. An electromotive power steering controller as recited in claim 1, wherein malfunction determination is forbidden when rotational speed of the motor is not lower than a value according to fifth predetermination.

9. An electromotive power steering controller as recited in claim 1, wherein motor driving is stopped if malfunction is determined.

10. An electromotive power steering controller as recited in claim 9, wherein electric power supplying to a driving-motor circuit is forbidden if malfunction is determined.

11. An electromotive power steering controller as recited in claim 9, wherein electric power supplying to a pre-driver of a driving-motor circuit is forbidden if malfunction is determined.

12. An electromotive power steering controller as recited in claim 9, wherein electric power supplying to the motor from a driving-motor circuit is forbidden if malfunction is determined.

* * * * *